United States Patent
Wurster et al.

(10) Patent No.: US 9,994,378 B2
(45) Date of Patent: Jun. 12, 2018

(54) PLASTIC CONTAINERS, BASE CONFIGURATIONS FOR PLASTIC CONTAINERS, AND SYSTEMS, METHODS, AND BASE MOLDS THEREOF

(75) Inventors: Michael P. Wurster, York, PA (US); Scott E. Bysick, Elizabethtown, PA (US)

(73) Assignee: GRAHAM PACKAGING COMPANY, L.P., Lancaster, PA (US)

( * ) Notice: Subject to any disclaimer, the term of this patent is extended or adjusted under 35 U.S.C. 154(b) by 487 days.

(21) Appl. No.: 13/210,358

(22) Filed: Aug. 15, 2011

(65) Prior Publication Data
US 2013/0043202 A1 Feb. 21, 2013

(51) Int. Cl.
| B65D 79/00 | (2006.01) |
| B65D 1/02 | (2006.01) |
| B29L 31/00 | (2006.01) |
| B29C 49/06 | (2006.01) |

(52) U.S. Cl.
CPC ......... *B65D 79/005* (2013.01); *B65D 1/0276* (2013.01); *B29C 49/06* (2013.01); *B29L 2031/716* (2013.01); *B29L 2031/7158* (2013.01); *B65D 2501/0036* (2013.01)

(58) Field of Classification Search
CPC ............... B65D 1/0276; B65D 79/005; B65D 2501/0036
USPC ........ 215/376, 372, 394; 220/606, 635, 636, 220/609
See application file for complete search history.

(56) References Cited

U.S. PATENT DOCUMENTS

| 1,499,239 A | 6/1924 | Malmquist |
| 2,142,257 A | 1/1937 | Saeta |
| D110,624 S | 7/1938 | Mekeel, Jr. |
| 2,124,959 A | 7/1938 | Vogel |
| 2,378,324 A | 6/1945 | Ray et al. |
| 2,880,902 A | 4/1959 | Owsen |
| 3,090,478 A | 8/1960 | Stanley |
| 2,960,248 A | 11/1960 | Kuhlman |
| 2,971,671 A | 2/1961 | Shakman |
| 2,982,440 A | 5/1961 | Harrison |

(Continued)

FOREIGN PATENT DOCUMENTS

| AU | 2002257159 B2 | 4/2003 |
| CA | 2077717 A1 | 3/1993 |

(Continued)

OTHER PUBLICATIONS

International Search Report for PCT/US06/40361 dated Feb. 26, 2007.

(Continued)

*Primary Examiner* — Andrew T Kirsch
*Assistant Examiner* — Jennifer Castriotta
(74) *Attorney, Agent, or Firm* — Baker Botts L.L.P.

(57) ABSTRACT

Plastic containers, base configurations for plastic containers, and systems, methods, and base molds thereof. Plastic containers have base portions constructed and operative to accommodate internal pressures within the container due to elevated temperature processing, such as hot-filling, pasteurization, and/or retort processing. Plastic containers can also be constructed and operative to accommodate internal pressures within the filled container resulting from subjecting the filled plastic container to cooling or cool-down processing.

16 Claims, 10 Drawing Sheets

(56) References Cited

U.S. PATENT DOCUMENTS

| | | |
|---|---|---|
| 3,043,461 A | 7/1962 | Glassco |
| 3,081,002 A | 3/1963 | Tauschinski et al. |
| 3,142,371 A | 7/1964 | Rice et al. |
| 3,174,655 A | 3/1965 | Hurschman |
| 3,198,861 A | 8/1965 | Marvel |
| 3,201,111 A | 8/1965 | Afton |
| 3,301,293 A | 1/1967 | Santelli |
| 3,325,031 A | 6/1967 | Singier |
| 3,397,724 A | 8/1968 | Bolen et al. |
| 3,409,167 A | 11/1968 | Blanchard |
| 3,417,893 A | 12/1968 | Lieberman |
| 3,426,939 A | 2/1969 | Young |
| 3,441,982 A | 5/1969 | Tsukahara et al. |
| 3,468,443 A | 9/1969 | Marcus |
| 3,483,908 A | 12/1969 | Donovan |
| 3,485,355 A | 12/1969 | Stewart |
| 3,693,828 A | 9/1972 | Kneusel et al. |
| 3,704,140 A | 11/1972 | Petit et al. |
| 3,727,783 A | 4/1973 | Carmichael |
| 3,791,508 A | 2/1974 | Osborne et al. |
| 3,819,789 A | 6/1974 | Parker |
| 3,904,069 A | 9/1975 | Toukmanian |
| 3,918,920 A | 11/1975 | Barber |
| 3,935,955 A | 2/1976 | Das |
| 3,941,237 A | 3/1976 | MacGregor, Jr. |
| 3,942,673 A | 3/1976 | Lyu et al. |
| 3,949,033 A | 4/1976 | Uhlig |
| 3,956,441 A | 5/1976 | Uhlig |
| 3,979,009 A | 9/1976 | Walker |
| 4,035,455 A | 7/1977 | Rosenkranz et al. |
| 4,036,926 A | 7/1977 | Chang |
| 4,037,752 A | 7/1977 | Dulmaine et al. |
| 4,117,062 A | 9/1978 | Uhlig |
| 4,123,217 A | 10/1978 | Fischer et al. |
| 4,125,632 A | 11/1978 | Vosti et al. |
| 4,134,510 A | 1/1979 | Chang |
| 4,147,271 A | 4/1979 | Yamaguchi |
| 4,158,624 A | 6/1979 | Ford et al. |
| 4,170,622 A | 10/1979 | Uhlig |
| 4,170,662 A | 10/1979 | Uhlig et al. |
| 4,174,782 A | 11/1979 | Obsomer |
| 4,177,239 A | 12/1979 | Gittner et al. |
| 4,219,137 A | 8/1980 | Hutchens |
| 4,231,483 A | 11/1980 | Dechenne et al. |
| 4,247,012 A | 1/1981 | Alberghini |
| 4,249,666 A | 2/1981 | Hubert et al. |
| 4,301,933 A | 11/1981 | Yoshino et al. |
| 4,318,489 A | 3/1982 | Snyder et al. |
| 4,318,882 A | 3/1982 | Agrawal et al. |
| 4,338,765 A | 7/1982 | Ohmori et al. |
| 4,355,728 A | 10/1982 | Ota et al. |
| 4,377,191 A | 3/1983 | Yamaguchi |
| 4,378,328 A | 3/1983 | Przytulla et al. |
| 4,381,061 A | 4/1983 | Cerny et al. |
| 4,386,701 A | 6/1983 | Galer |
| 4,436,216 A | 3/1984 | Chang |
| 4,444,308 A | 4/1984 | MacEwen |
| 4,450,878 A | 5/1984 | Takada et al. |
| 4,465,199 A | 8/1984 | Aoki |
| 4,495,974 A | 1/1985 | Pohorski |
| 4,497,855 A | 2/1985 | Agrawal et al. |
| 4,525,401 A | 6/1985 | Pocock et al. |
| 4,542,029 A | 9/1985 | Caner et al. |
| 4,547,333 A | 10/1985 | Takada |
| 4,585,158 A | 4/1986 | Wardlaw, III |
| D269,158 S | 5/1986 | Gaunt et al. |
| 4,610,366 A | 9/1986 | Estes et al. |
| 4,628,669 A | 12/1986 | Herron et al. |
| 4,642,968 A | 2/1987 | McHenry et al. |
| 4,645,078 A | 2/1987 | Reyner |
| 4,667,454 A | 5/1987 | McHenry et al. |
| 4,684,025 A | 8/1987 | Copland et al. |
| 4,685,273 A | 8/1987 | Caner et al. |
| D292,378 S | 10/1987 | Brandt et al. |
| 4,701,121 A | 10/1987 | Jakobsen et al. |
| 4,723,661 A | 2/1988 | Hoppmann et al. |
| 4,724,855 A | 2/1988 | Jackson et al. |
| 4,725,464 A | 2/1988 | Collette |
| 4,747,507 A | 5/1988 | Fitzgerald et al. |
| 4,749,092 A | 6/1988 | Sugiura et al. |
| 4,769,206 A | 9/1988 | Reymann et al. |
| 4,773,458 A | 9/1988 | Touzani |
| 4,785,949 A | 11/1988 | Krishnakumar et al. |
| 4,785,950 A | 11/1988 | Miller et al. |
| 4,807,424 A | 2/1989 | Robinson et al. |
| 4,813,556 A | 3/1989 | Lawrence |
| 4,831,050 A | 5/1989 | Cassidy et al. |
| 4,836,398 A | 6/1989 | Leftault, Jr. et al. |
| 4,840,289 A | 6/1989 | Fait et al. |
| 4,850,493 A | 7/1989 | Howard, Jr. |
| 4,850,494 A | 7/1989 | Howard, Jr. |
| 4,865,206 A | 9/1989 | Behm et al. |
| 4,867,323 A | 9/1989 | Powers |
| 4,880,129 A | 11/1989 | McHenry et al. |
| 4,887,730 A | 12/1989 | Touzani |
| 4,892,205 A | 1/1990 | Powers et al. |
| 4,896,205 A | 1/1990 | Weber |
| 4,921,147 A | 5/1990 | Poirier |
| 4,927,679 A | 5/1990 | Beck |
| 4,962,863 A | 10/1990 | Wendling et al. |
| 4,978,015 A | 12/1990 | Walker |
| 4,997,692 A | 3/1991 | Yoshino |
| 5,004,109 A | 4/1991 | Bartley et al. |
| 5,005,716 A | 4/1991 | Eberle |
| 5,014,868 A | 5/1991 | Wittig et al. |
| 5,020,691 A | 6/1991 | Nye |
| 5,024,340 A | 6/1991 | Alberghini et al. |
| 5,033,254 A | 7/1991 | Zenger |
| 5,054,632 A | 10/1991 | Alberghini et al. |
| 5,060,453 A | 10/1991 | Alberghini et al. |
| 5,067,622 A | 11/1991 | Garver et al. |
| 5,090,180 A | 2/1992 | Sörensen |
| 5,092,474 A | 3/1992 | Leigner |
| 5,122,327 A | 6/1992 | Spina et al. |
| 5,133,468 A | 7/1992 | Brunson et al. |
| 5,141,121 A | 8/1992 | Brown et al. |
| 5,178,290 A | 1/1993 | Ota et al. |
| 5,199,587 A | 4/1993 | Ota et al. |
| 5,199,588 A | 4/1993 | Hayashi |
| 5,201,438 A | 4/1993 | Norwood |
| 5,217,737 A | 6/1993 | Gygax et al. |
| 5,234,126 A | 8/1993 | Jonas et al. |
| 5,244,106 A | 9/1993 | Takacs |
| 5,251,424 A | 10/1993 | Zenger et al. |
| 5,255,889 A | 10/1993 | Collette et al. |
| 5,261,544 A | 11/1993 | Weaver, Jr. |
| 5,279,433 A | 1/1994 | Krishnakumar et al. |
| 5,281,387 A | 1/1994 | Collette et al. |
| 5,310,043 A | 5/1994 | Alcorn |
| 5,333,761 A | 8/1994 | Davis et al. |
| 5,337,909 A | 8/1994 | Vailliencourt |
| 5,337,924 A | 8/1994 | Dickie |
| 5,341,946 A | 8/1994 | Vailliencourt et al. |
| 5,389,332 A | 2/1995 | Amari et al. |
| 5,392,937 A | 2/1995 | Prevot et al. |
| 5,405,015 A | 4/1995 | Bhatia et al. |
| 5,407,086 A | 4/1995 | Ota et al. |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers, Jr. |
| 5,484,052 A | 1/1996 | Pawloski et al. |
| D366,831 S | 2/1996 | Semersky et al. |
| 5,492,245 A | 2/1996 | Kalbanis |
| 5,503,283 A | 4/1996 | Semersky |
| 5,543,107 A | 8/1996 | Malik et al. |
| 5,593,063 A | 1/1997 | Claydon et al. |
| 5,598,941 A | 2/1997 | Semersky et al. |
| 5,632,397 A | 5/1997 | Fandeux et al. |
| 5,642,826 A | 7/1997 | Melrose |
| 5,648,133 A | 7/1997 | Suzuki et al. |
| 5,672,730 A | 9/1997 | Cottman |
| 5,687,874 A | 11/1997 | Omori et al. |

(56) References Cited

U.S. PATENT DOCUMENTS

| | | |
|---|---|---|
| 5,690,244 A | 11/1997 | Darr |
| 5,697,489 A | 12/1997 | Deonarine et al. |
| 5,704,504 A | 1/1998 | Bueno |
| 5,713,480 A | 2/1998 | Petre et al. |
| 5,718,030 A | 2/1998 | Langmack et al. |
| 5,730,314 A | 3/1998 | Wiemann et al. |
| 5,730,914 A | 3/1998 | Ruppman, Sr. |
| 5,735,420 A | 4/1998 | Nakamaki et al. |
| 5,737,827 A | 4/1998 | Kuse et al. |
| 5,758,802 A | 6/1998 | Wallays |
| 5,762,221 A | 6/1998 | Tobias et al. |
| 5,780,130 A | 7/1998 | Hansen et al. |
| 5,785,197 A | 7/1998 | Slat |
| 5,819,507 A | 10/1998 | Kaneko et al. |
| 5,829,614 A | 11/1998 | Collette et al. |
| 5,860,556 A | 1/1999 | Robbins, III |
| 5,887,739 A | 3/1999 | Prevot et al. |
| 5,888,598 A | 3/1999 | Brewster et al. |
| 5,897,090 A | 4/1999 | Smith et al. |
| 5,906,286 A | 5/1999 | Matsuno et al. |
| 5,908,128 A | 6/1999 | Krishnakumar et al. |
| D413,519 S | 9/1999 | Eberle et al. |
| D415,030 S | 10/1999 | Searle et al. |
| 5,971,184 A | 10/1999 | Krishnakumar et al. |
| 5,976,653 A | 11/1999 | Collette et al. |
| 5,989,661 A | 11/1999 | Krishnakumar et al. |
| 6,016,932 A | 1/2000 | Gaydosh et al. |
| RE36,639 E | 4/2000 | Okhai |
| 6,045,001 A | 4/2000 | Seul |
| 6,051,295 A | 4/2000 | Schloss et al. |
| 6,063,325 A | 5/2000 | Nahill et al. |
| 6,065,624 A | 5/2000 | Steinke |
| 6,068,110 A | 5/2000 | Kumakiri et al. |
| 6,074,596 A | 6/2000 | Jacquet |
| 6,077,554 A | 6/2000 | Wiemann et al. |
| 6,090,334 A | 7/2000 | Matsuno et al. |
| 6,105,815 A | 8/2000 | Mazda |
| 6,113,377 A | 9/2000 | Clark |
| D433,946 S | 11/2000 | Rollend et al. |
| 6,176,382 B1 | 1/2001 | Bazlur |
| D440,877 S | 4/2001 | Lichtman et al. |
| 6,209,710 B1 | 4/2001 | Mueller et al. |
| 6,213,325 B1 | 4/2001 | Cheng et al. |
| 6,217,818 B1 | 4/2001 | Collette et al. |
| 6,228,317 B1 | 5/2001 | Smith et al. |
| 6,230,912 B1 | 5/2001 | Rashid |
| 6,248,413 B1 | 6/2001 | Barel et al. |
| 6,253,809 B1 | 7/2001 | Paradies |
| 6,273,282 B1 | 8/2001 | Ogg et al. |
| 6,277,321 B1 | 8/2001 | Vailliencourt et al. |
| 6,298,638 B1 | 10/2001 | Bettle |
| D450,595 S | 11/2001 | Ogg et al. |
| 6,354,427 B1 | 3/2002 | Pickel et al. |
| 6,375,025 B1 | 4/2002 | Mooney |
| 6,390,316 B1 | 5/2002 | Mooney |
| 6,409,035 B1 | 6/2002 | Darr et al. |
| 6,413,466 B1 | 7/2002 | Boyd et al. |
| 6,439,413 B1 | 8/2002 | Prevot et al. |
| 6,460,714 B1 | 10/2002 | Silvers et al. |
| 6,467,639 B2 | 10/2002 | Mooney |
| 6,485,669 B1 | 11/2002 | Boyd et al. |
| 6,494,333 B2 | 12/2002 | Sasaki et al. |
| 6,502,369 B1 | 1/2003 | Andison et al. |
| 6,514,451 B1 | 2/2003 | Boyd et al. |
| 6,569,376 B2 | 5/2003 | Wurster et al. |
| 6,585,123 B1 | 7/2003 | Pedmo et al. |
| 6,585,124 B2 | 7/2003 | Boyd et al. |
| 6,595,380 B2 | 7/2003 | Silvers |
| 6,612,451 B2 | 9/2003 | Tobias et al. |
| 6,635,217 B1 | 10/2003 | Britton |
| D482,976 S | 12/2003 | Melrose |
| 6,662,960 B2 | 12/2003 | Hong et al. |
| 6,672,470 B2 | 1/2004 | Wurster et al. |
| 6,676,883 B2 | 1/2004 | Hutchinson et al. |
| D492,201 S | 6/2004 | Pritchett et al. |
| 6,749,075 B2 | 6/2004 | Bourque et al. |
| 6,749,780 B2 | 6/2004 | Tobias |
| 6,763,968 B1 | 7/2004 | Boyd et al. |
| 6,763,969 B1 | 7/2004 | Melrose et al. |
| 6,769,561 B2 | 8/2004 | Futral et al. |
| 6,779,673 B2 | 8/2004 | Melrose et al. |
| 6,796,450 B2 | 9/2004 | Prevot et al. |
| 6,920,992 B2 | 7/2005 | Lane et al. |
| 6,923,334 B2 | 8/2005 | Melrose et al. |
| 6,929,138 B2 | 8/2005 | Melrose et al. |
| 6,932,230 B2 | 8/2005 | Pedmo et al. |
| 6,942,116 B2 | 9/2005 | Lisch et al. |
| 6,974,047 B2 | 12/2005 | Kelley et al. |
| 6,983,858 B2 | 1/2006 | Slat et al. |
| 7,051,073 B1 | 5/2006 | Dutta |
| 7,051,889 B2 | 5/2006 | Boukobza |
| D522,368 S | 6/2006 | Darr et al. |
| 7,073,675 B2 | 7/2006 | Trude |
| 7,077,279 B2 | 7/2006 | Melrose |
| 7,080,747 B2 | 7/2006 | Lane et al. |
| D531,910 S | 11/2006 | Melrose |
| 7,137,520 B1 | 11/2006 | Melrose |
| 7,140,505 B2 | 11/2006 | Roubal et al. |
| 7,150,372 B2 | 12/2006 | Lisch et al. |
| D535,884 S | 1/2007 | Davis et al. |
| 7,159,374 B2 | 1/2007 | Abercrombie, III et al. |
| D538,168 S | 3/2007 | Davis et al. |
| D547,664 S | 7/2007 | Davis et al. |
| 7,299,941 B2 | 11/2007 | McMahon et al. |
| 7,334,695 B2 | 2/2008 | Bysick et al. |
| 7,350,657 B2 | 4/2008 | Eaton et al. |
| D572,599 S | 7/2008 | Melrose |
| 7,416,089 B2 | 8/2008 | Kraft et al. |
| D576,041 S | 9/2008 | Melrose et al. |
| 7,451,886 B2 | 11/2008 | Lisch et al. |
| 7,543,713 B2 | 6/2009 | Trude et al. |
| 7,552,834 B2 | 6/2009 | Tanaka et al. |
| 7,574,846 B2 | 8/2009 | Sheets et al. |
| 7,694,842 B2 | 4/2010 | Melrose |
| 7,726,106 B2 | 6/2010 | Kelley et al. |
| 7,732,035 B2 | 6/2010 | Pedmo et al. |
| 7,735,304 B2 | 6/2010 | Kelley et al. |
| 7,748,551 B2 | 7/2010 | Gatewood et al. |
| 7,753,713 B2 | 7/2010 | Neale, III |
| 7,780,025 B2 | 8/2010 | Simpson et al. |
| D623,952 S | 9/2010 | Yourist et al. |
| 7,799,264 B2 | 9/2010 | Trude |
| 7,882,971 B2 | 2/2011 | Kelley et al. |
| 7,900,425 B2 | 3/2011 | Bysick et al. |
| 7,926,243 B2 | 4/2011 | Kelley et al. |
| D637,495 S | 5/2011 | Gill et al. |
| D637,913 S | 5/2011 | Schlies et al. |
| D641,244 S | 7/2011 | Bysick et al. |
| 7,980,404 B2 | 7/2011 | Trude et al. |
| 8,011,166 B2 | 9/2011 | Sheets et al. |
| 8,017,065 B2 | 9/2011 | Trude et al. |
| D646,966 S | 10/2011 | Gill et al. |
| 8,028,498 B2 | 10/2011 | Melrose |
| 8,047,388 B2 | 11/2011 | Kelley et al. |
| 8,075,833 B2 | 12/2011 | Kelley |
| D653,119 S | 1/2012 | Hunter et al. |
| 8,096,098 B2 | 1/2012 | Kelley et al. |
| D653,550 S | 2/2012 | Hunter |
| D653,957 S | 2/2012 | Yourist et al. |
| 8,162,655 B2 | 4/2012 | Trude et al. |
| 8,171,701 B2 | 5/2012 | Kelley et al. |
| 8,205,749 B2 | 6/2012 | Korpanty et al. |
| 8,235,704 B2 | 8/2012 | Kelley |
| 8,323,555 B2 | 12/2012 | Trude et al. |
| 2001/0035391 A1 | 1/2001 | Young et al. |
| 2002/0063105 A1 | 5/2002 | Darr et al. |
| 2002/0074336 A1 | 6/2002 | Silvers |
| 2002/0096486 A1 | 7/2002 | Bourque et al. |
| 2002/0153343 A1 | 10/2002 | Tobias |
| 2002/0158038 A1 | 10/2002 | Heisel et al. |
| 2003/0015491 A1 | 1/2003 | Melrose et al. |
| 2003/0186006 A1 | 10/2003 | Schmidt et al. |
| 2003/0196926 A1 | 10/2003 | Tobias et al. |
| 2003/0205550 A1 | 11/2003 | Prevot et al. |

(56) References Cited

U.S. PATENT DOCUMENTS

| | | |
|---|---|---|
| 2003/0217947 A1 | 11/2003 | Ishikawa et al. |
| 2004/0000533 A1 | 1/2004 | Kamineni et al. |
| 2004/0016716 A1 | 1/2004 | Melrose et al. |
| 2004/0074864 A1 | 4/2004 | Melrose et al. |
| 2004/0129669 A1 | 7/2004 | Kelley et al. |
| 2004/0149677 A1 | 8/2004 | Slat et al. |
| 2004/0173565 A1 | 9/2004 | Semersky et al. |
| 2004/0211746 A1 | 10/2004 | Trude |
| 2004/0232103 A1 | 11/2004 | Lisch et al. |
| 2005/0035083 A1 | 2/2005 | Pedmo et al. |
| 2005/0211662 A1 | 9/2005 | Eaton et al. |
| 2005/0218108 A1 | 10/2005 | Bangi et al. |
| 2006/0006133 A1 | 1/2006 | Lisch et al. |
| 2006/0051541 A1 | 3/2006 | Steele |
| 2006/0113274 A1 | 6/2006 | Keller et al. |
| 2006/0138074 A1 | 6/2006 | Melrose |
| 2006/0138075 A1 | 6/2006 | Roubal et al. |
| 2006/0151425 A1 | 7/2006 | Kelley et al. |
| 2006/0231985 A1 | 10/2006 | Kelley |
| 2006/0243698 A1 | 11/2006 | Melrose |
| 2006/0255005 A1 | 11/2006 | Melrose et al. |
| 2006/0261031 A1 | 11/2006 | Melrose |
| 2007/0017892 A1 | 1/2007 | Melrose |
| 2007/0045222 A1 | 3/2007 | Denner et al. |
| 2007/0045312 A1 | 3/2007 | Abercrombie, III et al. |
| 2007/0051073 A1 | 3/2007 | Kelley et al. |
| 2007/0084821 A1 | 4/2007 | Bysick et al. |
| 2007/0125742 A1 | 6/2007 | Simpson, Jr. et al. |
| 2007/0125743 A1 | 6/2007 | Pritchett, Jr. et al. |
| 2007/0131644 A1 | 6/2007 | Melrose |
| 2007/0181403 A1 | 8/2007 | Sheets et al. |
| 2007/0199915 A1 | 8/2007 | Denner et al. |
| 2007/0199916 A1 | 8/2007 | Denner et al. |
| 2007/0215571 A1 | 9/2007 | Trude |
| 2007/0235905 A1 | 10/2007 | Trude et al. |
| 2008/0047964 A1 | 2/2008 | Denner et al. |
| 2008/0156847 A1 | 7/2008 | Hawk et al. |
| 2008/0257856 A1 | 10/2008 | Melrose et al. |
| 2009/0090728 A1 | 4/2009 | Trude et al. |
| 2009/0091067 A1 | 4/2009 | Trude et al. |
| 2009/0092720 A1 | 4/2009 | Trude et al. |
| 2009/0120530 A1 | 5/2009 | Kelley et al. |
| 2009/0134117 A1 | 5/2009 | Mooney |
| 2009/0159556 A1* | 6/2009 | Patcheak et al. ............ 215/373 |
| 2009/0202766 A1 | 8/2009 | Beuerle et al. |
| 2009/0242575 A1 | 10/2009 | Kamineni et al. |
| 2009/0293436 A1 | 12/2009 | Miyazaki et al. |
| 2010/0018838 A1 | 1/2010 | Kelley et al. |
| 2010/0133228 A1 | 6/2010 | Trude |
| 2010/0140838 A1 | 6/2010 | Kelley et al. |
| 2010/0116778 A1 | 7/2010 | Melrose |
| 2010/0163513 A1 | 7/2010 | Pedmo |
| 2010/0170199 A1 | 7/2010 | Kelley et al. |
| 2010/0213204 A1 | 8/2010 | Melrose |
| 2010/0219152 A1 | 9/2010 | Derrien et al. |
| 2010/0237083 A1* | 9/2010 | Trude et al. ................. 220/606 |
| 2010/0270259 A1 | 10/2010 | Russell et al. |
| 2010/0301058 A1 | 12/2010 | Trude et al. |
| 2011/0049083 A1 | 3/2011 | Scott et al. |
| 2011/0049084 A1 | 3/2011 | Yourist et al. |
| 2011/0084046 A1 | 4/2011 | Schlies et al. |
| 2011/0094618 A1 | 4/2011 | Melrose |
| 2011/0108515 A1 | 5/2011 | Gill et al. |
| 2011/0113731 A1 | 5/2011 | Bysick et al. |
| 2011/0132865 A1 | 6/2011 | Hunter et al. |
| 2011/0147392 A1 | 6/2011 | Trude et al. |
| 2011/0210133 A1 | 9/2011 | Melrose et al. |
| 2011/0266293 A1 | 11/2011 | Kelley et al. |
| 2011/0284493 A1 | 11/2011 | Yourist et al. |
| 2012/0074151 A1 | 3/2012 | Gill et al. |
| 2012/0104010 A1 | 5/2012 | Kelley |
| 2012/0107541 A1 | 5/2012 | Nahill et al. |
| 2012/0118899 A1 | 5/2012 | Wurster et al. |
| 2012/0132611 A1 | 5/2012 | Trude et al. |
| 2012/0152964 A1 | 6/2012 | Kelley et al. |
| 2012/0240515 A1 | 9/2012 | Kelley et al. |
| 2012/0266565 A1 | 10/2012 | Trude et al. |
| 2012/0267381 A1 | 10/2012 | Trude et al. |
| 2013/0000259 A1 | 1/2013 | Trude et al. |

FOREIGN PATENT DOCUMENTS

| | | |
|---|---|---|
| DE | 1761753 | 1/1972 |
| DE | P2102319.8 | 8/1972 |
| DE | 3215866 A1 | 11/1983 |
| EP | 225 155 A2 | 6/1987 |
| EP | 225155 A2 | 6/1987 |
| EP | 346518 A1 | 12/1989 |
| EP | 0 502 391 A2 | 9/1992 |
| EP | 0 505054 A1 | 9/1992 |
| EP | 0551788 A1 | 7/1993 |
| EP | 0666222 A1 | 2/1994 |
| EP | 0 739 703 | 10/1996 |
| EP | 0521624 B1 | 12/1996 |
| EP | 0609348 B1 | 2/1997 |
| EP | 0916406 A2 | 5/1999 |
| EP | 0957030 A2 | 11/1999 |
| EP | 1063076 A1 | 12/2000 |
| FR | 1571499 | 6/1969 |
| FR | 2607109 | 5/1988 |
| FR | 2938464 A1 | 5/2010 |
| GB | 781103 | 8/1957 |
| GB | 1113988 | 5/1968 |
| GB | 2050919 A | 1/1981 |
| GB | 2372977 A | 9/2002 |
| JP | S40-15909 | 6/1940 |
| JP | 48-31050 | 9/1973 |
| JP | 49-28628 | 7/1974 |
| JP | 54-72181 A | 6/1979 |
| JP | 35656830 A | 5/1981 |
| JP | S56-62911 | 5/1981 |
| JP | 56-72730 U | 6/1981 |
| JP | 54-070185 | 1/1982 |
| JP | 57-210829 A | 1/1982 |
| JP | 57-37827 | 2/1982 |
| JP | 57-37827 U | 2/1982 |
| JP | 57-0177730 | 2/1982 |
| JP | 57-126310 | 8/1982 |
| JP | 58-055005 | 4/1983 |
| JP | 61-192539 A | 8/1986 |
| JP | 63-189224 A | 8/1988 |
| JP | 57-126310 | 2/1989 |
| JP | 64-004662 | 2/1989 |
| JP | 3-43342 | 2/1991 |
| JP | 3-43342 A | 2/1991 |
| JP | 03-076625 A | 4/1991 |
| JP | 4-10012 | 1/1992 |
| JP | 5-193694 | 8/1993 |
| JP | 53-10239 A | 11/1993 |
| JP | H05-81009 | 11/1993 |
| JP | 06-270235 A | 9/1994 |
| JP | 6-336238 A | 12/1994 |
| JP | H08-048322 | 2/1995 |
| JP | 07-300121 A | 11/1995 |
| JP | 08-244747 A | 9/1996 |
| JP | 8-253220 A | 10/1996 |
| JP | 8-282633 A | 10/1996 |
| JP | 09-039934 A | 2/1997 |
| JP | 9-110045 A | 4/1997 |
| JP | 10-167226 A | 6/1998 |
| JP | 10-181734 A | 7/1998 |
| JP | 10-230919 A | 9/1998 |
| JP | 3056271 | 11/1998 |
| JP | 11-218537 | 8/1999 |
| JP | 2000-229615 | 8/2000 |
| JP | 2002-127237 A | 5/2002 |
| JP | 2002-160717 A | 6/2002 |
| JP | 2002-326618 A | 11/2002 |
| JP | 2003-095238 | 4/2003 |
| JP | 2004-026307 A | 1/2004 |
| JP | 2006-501109 | 1/2006 |
| JP | 2007-216981 A | 8/2007 |
| JP | 2008-189721 A | 8/2008 |
| JP | 2009-001639 A | 1/2009 |

(56) References Cited

FOREIGN PATENT DOCUMENTS

| | | |
|---|---|---|
| MX | a/2011/005247 A | 6/2011 |
| NZ | 240448 | 6/1995 |
| NZ | 296014 | 10/1998 |
| NZ | 335565 | 10/1999 |
| NZ | 506684 | 9/2001 |
| NZ | 512423 | 9/2001 |
| NZ | 521694 | 10/2003 |
| WO | WO 93/09031 A1 | 5/1993 |
| WO | WO 93/12975 A1 | 7/1993 |
| WO | WO 94/05555 | 3/1994 |
| WO | WO 94/06617 | 3/1994 |
| WO | WO 97/03885 | 2/1997 |
| WO | WO 97/14617 | 4/1997 |
| WO | WO 97/34808 | 9/1997 |
| WO | WO 97/34808 A1 | 9/1997 |
| WO | WO 99/21770 | 5/1999 |
| WO | WO 00/38902 A1 | 7/2000 |
| WO | WO 00/51895 A1 | 9/2000 |
| WO | WO 01/12531 A1 | 2/2001 |
| WO | WO 01/40081 A1 | 6/2001 |
| WO | WO 01/74689 A1 | 10/2001 |
| WO | WO 02/02418 A1 | 1/2002 |
| WO | WO 02/18213 A1 | 3/2002 |
| WO | WO 02/085755 A1 | 10/2002 |
| WO | WO 2004/028910 A1 | 4/2004 |
| WO | WO 2004/106176 A2 | 9/2004 |
| WO | WO 2004/106175 A1 | 12/2004 |
| WO | WO 2005/012091 A2 | 2/2005 |
| WO | WO 2005/025999 A1 | 3/2005 |
| WO | WO 2005/087628 A1 | 9/2005 |
| WO | WO 2006/113428 A2 | 10/2006 |
| WO | WO 2007/047574 A1 | 4/2007 |
| WO | WO 2007/127337 A2 | 11/2007 |
| WO | WO 2010/058098 A2 | 5/2010 |

OTHER PUBLICATIONS

IPRP (including Written Opinion) for PCT/US2006/040361 dated Apr. 16, 2008.
International Search Report for PCT/US2004/016405 dated Feb. 15, 2005.
IPRP (including Written Opinion) for PCT/US2004/016405 dated Nov. 25, 2005.
"Application and Development of PET Plastic Bottle," Publication of Tsinghad Tongfang Optical Disc Co. Ltd., Issue 4, 2000, p. 41. (No English language translation available).
Manas Chanda & Salil K. Roy, Plastics Technology Handbook, Fourth Edition, 2007 CRC Press, Taylor & Francis Group, pp. 2-34-2-37.
U.S. Appl. No. 13/210,350, filed Aug. 15, 2011, Wurster et al.
U.S. Appl. No. 13/251,956, filed Oct. 3, 2011, Howell et al.
U.S. Appl. No. 13/410,902, filed Mar. 2, 2012, Gill.
U.S. Appl. No. 60/220,326, (filed Jul. 24, 2000) dated Oct. 29, 2008.
Final Office Action for U.S. Appl. No. 10/553,284 dated Sep. 9, 2008.
Office Action for U.S. Appl. No. 10/558,284 dated Jan. 25, 2008.
Office Action for U.S. Appl. No. 10/851,083 dated Nov. 28, 2008.
Final Office Action for U.S. Appl. No. 10/851,083 dated Jun. 12, 2008.
Office Action for U.S. Appl. No. 10/851,083 dated Sep. 6, 2007.
International Search Report for PCT/US2005/008374 dated Aug. 2, 2005.
IPRP (Including Written Opinion) for PCT/US2005/008374 dated Sep. 13, 2006.
Office Action for Application No. EP 06 750 165.0-2307 dated Nov. 24, 2008.
International Search Report and Written Opinion for PCT/US2007/006318 dated Sep. 11, 2007.
International Search Report for PCT/US2006/014055 dated Aug. 24, 2006.
IPRP (including Written Opinion) PCT/US2006/014055 dated Oct. 16, 2007.
International Search Report for PCT/US2004/024581 dated Jul. 25, 2005.
IPRP (including Written Opinion) for PCT/US2004/024581 dated Jan. 30, 2006.
Final Office Action for U.S. Appl. No. 10/566,294 dated Feb. 13, 2009.
Office Action for U.S. Appl. No. 10/565,294 dated Oct. 27, 2008.
International Search Report and Written Opinion dated Mar. 15, 2010 for PCT/US2010/020045.
Official Notification for counterpart Japanese Application No. 2006-522084 dated May 19, 2009.
Examination Report for counterpart New Zealand Application No. 545528 dated Jul. 1, 2008.
Examination Report for counterpart New Zealand Application No. 569422 dated Jul. 1, 2008.
Examination Report for New Zealand Application No. 550336 dated Mar. 26, 2009.
Examination Report for counterpart New Zealand Application No. 545528 dated Sep. 20, 2007.
Examination Report for counterpart New Zealand Application No. 569422 dated Sep. 29, 2009.
Office Action for Chinese Application No. 2006800380748 dated Jul. 10, 2009.
Examiner's Report for Australian Application No. 2006236674 dated Sep. 18, 2009.
Examiner's Report for Australian Application No. 2006236674 dated Nov. 6, 2009.
Office Action for Chinese Application No. 200680012360.7 dated Jul. 10, 2009.
Examination Report for New Zealand Application No. 563134 dated Aug. 3, 2009.
Office Action for European Application No. 07752979.0-2307 dated Aug. 21, 2009.
International Search Report for PCT/US2006/014055 dated Dec. 7, 2006.
International Search Report and Written Opinion dated Sep. 8, 2009 for PCT/US2009/051023.
Office Action dated Feb. 3, 2010 for Canadian Application No. 2,604,231.
Communication dated Mar. 9, 2010 for European Application No. 09 173 607.4 enclosing European search report and European search opinion dated Feb. 25, 2010.
European Search Report for EPA 10185697.9 dated Mar. 21, 2011.
International Search report dated Apr. 21, 2010 from corresponding PCT/US2009/066191 filed Dec. 1, 2009.
International Preliminary Report on Patentability and Written Opinion dated Jun. 14, 2011 for PCT/US2009/066191. 7 pages.
Office Action, Japanese Application No. 2008-506738 dated Aug. 23, 2011.
Extended European Search Report for EPA 10185697.9 dated Jul. 6, 2011.
Patent Abstracts of Japan, vol. 012, No. 464, Dec. 6, 1988.
Patent Abstracts of Japan, vol. 2002, No. 09, Sep. 4, 2002.
Patent Abstracts of Japan, vol. 015, No. 239, Jun. 20, 1991.
Examination Report dated Jul. 25, 2012, in New Zealand Patent Application No. 593486.
Taiwanese Office Action dated Jun. 10, 2012, Application No. 095113450.
Japanese First Notice of Reasons for Rejection dated Aug. 23, 2011, in Application No. 2008-506738.
Japanese Second Notice of Reasons for Rejection dated Jun. 11, 2012, in Application No. 2008-506738.
Office Action dated Aug. 14, 2012, in Japanese Patent Application No. 2008-535769.
Examiner's Report dated Feb. 15, 2011 in Australian Application No. AU200630483.
Office Action dated Oct. 31, 2011, in Australian Patent Application No. 2011203263.
Office Action dated Jul. 19, 2011, in Japanese Patent Application No. 2008-535769.

(56) References Cited

OTHER PUBLICATIONS

Office Action dated Dec. 6, 2011, in Japanese Patent Application No. 2008-535769.
International Search Report and Written Opinion for PCT/US2012/050251 dated Nov. 16, 2012.
Internatonal Search Report and Written Opinion for PCT/US2012/050256 dated Dec. 6, 2012.
Requisition dated Feb. 3, 2010 for Canadian Application No. 2,604,231.
Requisition dated Jan. 9, 2013 for Canadian Application No. 2,559,319.
Office Action dated Feb. 5, 2013, in Mexican Patent Application No. MX/a/2008/004703.
Office Action dated Jul. 26, 2010 for Canadian Application No. 2,527,001.
Australian Office Action dated Mar. 3, 2011 in Application No. 2010246525.
Australian Office Action dated Nov. 8, 2011, in Application No. 2011205106.
Examiner Report dated May 26, 2010, in Australian Application No. 2004261654.
Examiner Report dated Jul. 23, 2010, in Australian Application No. 2004261654.
Requisition dated May 25, 2010 for Canadian Application No. 2,534,266.
Communication dated Jun. 16, 2006, for European Application No. 04779595.0.
Final Official Notification dated Mar. 23, 2010 for Japanese Application No. 2006-522084.
International Search Report and Written Opinion dated Dec. 18, 2012, in PCT/US12/056330.
Trial Decision dated Mar. 26, 2013 in Japanese Patent Application No. 2008-535759.

* cited by examiner

PLASTIC CONTAINERS, BASE CONFIGURATIONS FOR PLASTIC CONTAINERS, AND SYSTEMS, METHODS, AND BASE MOLDS THEREOF

FIELD

The disclosed subject matter relates to plastic containers, base configurations for plastic containers, and systems, methods, and base molds thereof. In particular, the disclosed subject matter involves plastic containers having base portions constructed and operative to accommodate internal pressures within the container due to elevated temperature processing, such as hot-filling, pasteurization, and/or retort processing. Plastic containers according to embodiments of the disclosed subject matter can also be constructed and operative to accommodate internal pressures within the filled container resulting from subjecting the filled plastic container to cooling or cool-down processing.

SUMMARY

The Summary describes and identifies features of some embodiments. It is presented as a convenient summary of some embodiments, but not all. Further the Summary does not necessarily identify critical or essential features of the embodiments, inventions, or claims.

According to embodiments, a hot-fillable, blow-molded plastic wide-mouth jar configured to be filled with a viscous food product at a temperature from 185° F. to 205° F., can comprise: a cylindrical sidewall being configured to support a wrap-around label; a wide-mouth finish projecting from an upper end of said sidewall via a shoulder, said finish operative to receive a closure, and said shoulder defining an upper label stop above said sidewall; and a base defining a lower label stop below said sidewall. The base has a bottom end that includes: a bearing portion defining a standing surface for the jar, the base being smooth and without surface features from said bearing portion to said lower label stop; an up-stand wall which extends upward and radially inward from said bearing portion; and a diaphragm circumscribed by said up-stand wall in end view of the jar. The diaphragm has a plurality of concentric rings in spaced-apart relation with one another, and, in an as-formed, blow molded condition, is at an angle in the range of three to fourteen degrees downward from horizontal, and is operative to move in response to pressure variation within the jar after the jar has been hot-filled with the product at the temperature from 185° F. to 205° F. and sealed with the closure. The pressure variation includes increased pressure and decreased pressure, separately, the increased pressure being headspace pressure associated with the hot-filling with the product at the temperature from 185° F. to 205° F. and sealing the jar, and the decreased pressure being an internal vacuum associated with cooling of the hot-filled and sealed jar. The diaphragm is constructed and operative to move downward in response to the headspace pressure. The diaphragm is also constructed and operative to move upward in response to the vacuum.

Embodiments also include a hot-fillable, blow-molded plastic wide-mouth jar configured to be filled with a viscous food product at a temperature from 185° F. to 205° F. that comprises: a cylindrical sidewall being configured to support a wrap-around label; a wide-mouth finish projecting from an upper end of said sidewall via a shoulder, said finish operative to receive a closure, and said shoulder defining an upper label stop above said sidewall; and a base defining a lower label stop below said sidewall. The base has a bottom end that includes: a bearing portion defining a standing surface for the jar, the base being smooth and without surface features from said bearing portion to said lower label stop; an up-stand wall which extends upward and radially inward from said bearing portion; and an inner wall having a single major radius and being circumscribed by said up-stand wall in an end view of the jar. The inner wall, in an as-formed, blow molded condition, sloping downward and axially outward, including a gate riser at a central longitudinal axis of the jar and a smooth portion without any surface features circumscribing the gate riser, and being operative to accommodate pressure variation within the jar after the jar has been hot-filled with the product at the temperature from 185° F. to 205° F. and sealed with the closure. The pressure variation includes increased pressure and decreased pressure, separately, the increased pressure being headspace pressure associated with the hot-filling with the product at the temperature from 185° F. to 205° F. and sealing the jar, the decreased pressure being an internal vacuum associated with cooling of the hot-filled and sealed jar. The inner wall resists and does not move downward in response to the increased pressure, and the inner wall is caused to move upward in response to the vacuum.

In embodiments, a method comprises providing a blow-molded plastic container, the plastic container including a sidewall configured to support a film label, a finish projecting from an upper end of the sidewall and operative to cooperatively receive a closure to sealingly enclose the plastic container, and a base extending from the sidewall to form a bottom enclosed end of the plastic container, wherein the bottom end has a standing ring upon which the container may rest, a substantially stationary wall which extends axially upward and radially inward from the standing ring, and a movable wall, which, in its as-formed state, extends radially inward from the stationary wall toward a central longitudinal axis of the container, the movable wall also extending axially outward in its as-formed state. The method also can comprise hot-filling the plastic container via the finish with a product; sealing the hot-filled plastic container with the closure; cooling the hot-filled and sealed plastic container; and compensating for an internal pressure characteristic after hot-filling and sealing the plastic container.

Embodiments also include a base mold to form a bottom end portion of a base of a plastic wide-mouth jar, the bottom end portion of the plastic jar having a bottom bearing surface of the jar, a stationary wall extending upward from the bottom bearing surface, and an inner flexible wall arranged inwardly of the stationary wall, wherein the base mold comprises: a body portion; a bearing surface forming portion to form a portion of the bottom bearing surface; a stationary wall forming portion to form the stationary wall; and an inner flexible wall forming portion to form the inner flexible wall. The inner flexible wall forming portion includes an upwardly protruding gate portion and a smooth portion without any surface features that circumscribes the gate portion. Optionally, the base mold further includes a ridge forming portion between said stationary wall forming portion and said inner flexible wall forming portion to form a ridge. Optionally, the smooth portion of the inner flexible wall forming portion includes a plurality of concentric grooves in spaced-apart relationship with one another, the grooves being to form concentric rings of the jar.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Any values dimensions illustrated in the accompanying graphs and figures are for illustration purposes only and may not represent actual or preferred values or dimensions. Where applicable, some features may not be illustrated to assist in the description of underlying features.

DETAILED DESCRIPTION

Figure 1:
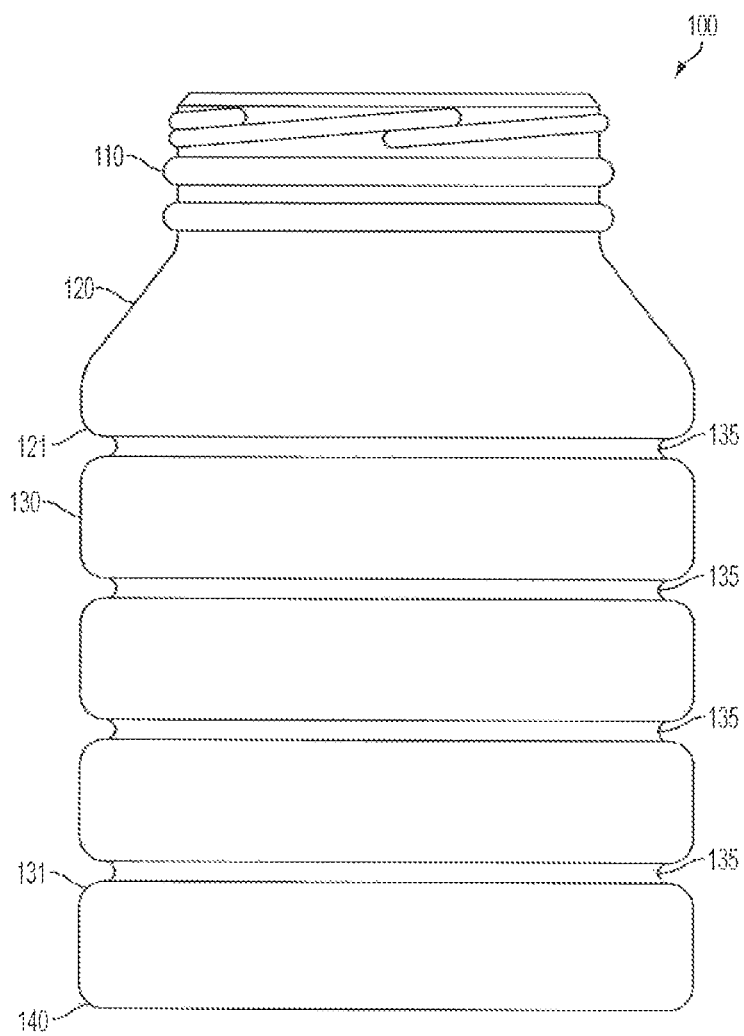
FIG. 1 is a side view of a plastic container according to embodiments of the disclosed subject matter.

The detailed description set forth below in connection with the appended drawings is intended as a description of various embodiments of the disclosed subject matter and is not intended to represent the only embodiments in which the disclosed subject matter may be practiced. The detailed description includes specific details for the purpose of providing a thorough understanding of the disclosed subject matter. However, it will be apparent to those skilled in the art that the disclosed subject matter may be practiced without these specific details. In some instances, well-known structures and components may be shown in block diagram form in order to avoid obscuring the concepts of the disclosed subject matter.

The disclosed subject matter involves plastic containers, base configurations for plastic containers, and systems, methods, and base molds thereof. More particularly, the disclosed subject matter involves plastic containers having base portions that are constructed and operative to accommodate elevated temperature processing, such as hot-filling, pasteurization, and/or retort processing. Plastic containers according to embodiments of the disclosed subject matter also may be configured and operative to accommodate internal forces caused by post elevated temperature processing, such as temperature-induced forces from varying temperatures in transit to or in storage at a distributor (e.g., wholesale or retail vendor), for example, prolonged effects of the weight of the product stored therein over time, etc., and/or cooling operations (including exposure to ambient temperature) after or between elevated temperature processing.

Generally speaking, in various embodiments, a bottom end portion of the container can move in response to internal pressures within the container when hot-filled and sealed, for instance. Optionally, the bottom end portion may be constructed and operative to move downwardly and axially outward in response to internal pressures, such as headspace pressure and/or under the weight of the product, and also to move upwardly and axially inward in response to a different internal pressure, such as an internal vacuum created within the container due to cooling or cooling processing of the container. Alternatively, the bottom end portion may be constructed and operative to resist movement in one direction, for example, a downward and axially outward direction in response to internal pressures (e.g., headspace pressure, product weight, etc.), but may be constructed and operative to move upward and axially inward in response to a different internal pressure, such as an internal vacuum created within the container due to cooling or cooling processing of the container.

Base portions of containers also may have an inner wall coupled to the bottom end portion of the container that is movable that may assist or accommodate movement or flexure of the movable bottom end portion. The inner wall can be oriented or arranged directly vertically from the standing or support portion of the container base, or it can be oriented or arranged substantially directly vertically, angling or sloping radially inward, for instance. The inner wall can be constructed and operative to remain stationary during movement of the movable bottom end portion. Optionally, the inner wall may be constructed and operative to move or flex radially inward slightly during movement of the movable bottom end portion. Optionally, the inner wall may be constructed and operative to move or flex radially outward during movement of the movable bottom end portion.

Plastic containers according to embodiments of the disclosed subject matter can be of any suitable configuration. For example, embodiments may include jars, such as wide-mouth jars, and base configurations thereof. Embodiments may also include single serve containers, bottles, jugs, asymmetrical containers, or the like, and base configurations thereof. Thus, embodiments of the disclosed subject matter can be filled with and contain any suitable product including a fluent, semi-fluent, or viscous food product, such as applesauce, spaghetti sauce, relishes, baby foods, brine, jelly, and the like, or a non-food product such as water, tea, juice, isotonic drinks or the like.

Plastic containers according to embodiments of the disclosed subject matter can be of any suitable size. For example, embodiments include containers with internal volumes of 24 oz., 45 oz., 48 oz., or 66 oz. Also, container sizes can include single-serving and multiple-serving size containers. Further, embodiments can also include containers with mouth diameters of 38 mm, 55 mm or higher, for instance.

Hot-fill processing can include filling a product into the container at any temperature in a range of at or about 130° F. to at or about 205° F. or in a range of at or about 185° F.

to at or about 205° F. Optionally, the hot-fill temperature can be above 205° F. For example, a wide-mouth jar can be filled with a hot product at a temperature of at or about 205° F., such as 208° F. As another example, a single-serve container, such as for an isotonic, can be filled with a hot product at a temperature of 185° F. or slightly below.

Plastic containers according to embodiments of the disclosed subject matter can be capped or sealed using any suitable closure, such as a plastic or metallic threaded cap or lid, a foil seal, a lug closure, a plastic or metallic snap-fit lid or cap, etc.

Plastic containers according to embodiments of the disclosed subject matter can also optionally be subjected to through processing, such as pasteurization and/or retort processing.

Pasteurization can involve heating a filled and sealed container and/or the product therein to any temperature in the range of at or about 200° F. to at or about 215° F. or at or about 218° F. for any time period at or about five minutes to at or about forty minutes, for instance. In various embodiments, a hot rain spray may be used to heat the container and its contents.

Retort processing for food products, for instance, can involve heating a filled and sealed container and/or the product therein to any temperature in the range of at or about 230° F. to at or about 270° F. for any time period at or about twenty minutes to at or about forty minutes, for instance. Overpressure also may be applied to the container by any suitable means, such as a pressure chamber.

FIG. 1 is a side view of a plastic container in the form of a blow-molded plastic wide-mouth jar 100 according to embodiments of the disclosed subject matter. Of course, plastic containers according to embodiments of the disclosed subject matter are not limited to jars and can include other plastic containers, such as bottles, jugs, asymmetrical containers, or the like. Jar 100 is shown in FIG. 1 in its empty condition, after blow-molding but before hot-filling and sealing with a closure, and in the absence of any internal or external applied forces.

Jar 100 can be configured and operative to undergo elevated temperature processing, such as hot-filling, pasteurization, and/or retort processing. For example, jar 100 may receive a food product as described herein at an elevated temperature as described herein, such as at a temperature from 185° F. to 205° F. Jar 100 also can be constructed and operative to undergo cooling processing or cool-down operations. Jar 100 is further constructed and operative to accommodate or react in a certain manner to any of the aforementioned forces or pressures. Jar 100 also may be subjected to forces caused by post hot-fill and cooling operations, such as temperature-induced forces from varying temperatures in transit to or in storage at a distributor (e.g., wholesale or retail vendor), prolonged effects of the weight of the product stored therein over time, etc.

Jar 100 can include tubular sidewall 130, a threaded finish 110 operative to receive a threaded closure (e.g., a lid), a shoulder or dome 120, and a base 140. Threaded finish 110 can be a wide-mouth finish and may be of any suitable dimension. For instance, the wide-mouth finish may have a diameter of 55 mm. Alternatively, finish 110 may not be threaded, and another form of a closure may be implemented.

Jar 100 also may have upper and lower label bumpers or stops 121, 131. Label bumpers 121, 131 may define a label area between which a label, such as a wrap-around label, can be affixed to sidewall 130. Optionally, sidewall 130 may include a plurality of concentric ribs or rings 135, circumscribing the sidewall 130 horizontally. Ribs 135 may be provided in order to reinforce the sidewall 130 and to resist or prevent paneling, denting, barreling, ovalization, and/or other unwanted deformation of the sidewall 130, for example, in response to elevated temperature and/or cooling processing. Not explicitly shown, one or more supplemental vacuum panels may be located on the dome 120 it order to prevent unwanted deformation of sidewall 130. Thus, the one or more supplemental vacuum panels may take up a portion of in induced vacuum caused by cooling a filled and sealed jar 100, and, as will be discussed in more detail below, an inner wall may flex or move to take up or remove a second portion of the induced vacuum.

Figure 2:
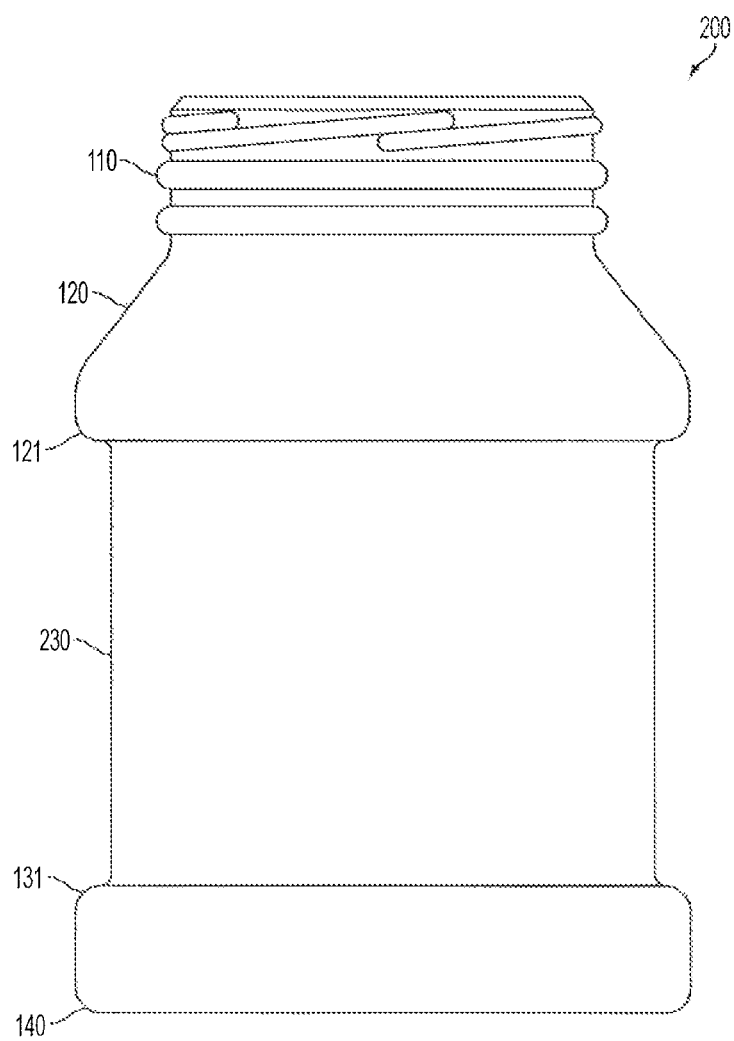
FIG. 2 is a side view of another plastic container according to embodiments of the disclosed subject matter.

FIG. 2 is a side view of another plastic container in the form of a jar 200 according to embodiments of the disclosed subject matter. As can be seen, jar 200 is similar to jar 100, but without ribs 135 in its sidewall 230. Upper and lower label bumpers or stops 121, 131 are shown more pronounced in FIG. 2, however, their dimensions in relation to sidewall 230 may be similar to or the same as shown in the jar 100 of FIG. 1. Additionally, jar 200 also may include one or more supplemental vacuum panels. Such one or more supplemental vacuum panels may be located on the dome 120 and/or in the sidewall 230 and/or between bumper stop 131 and the bottom standing support formed by the base 140. Accordingly, as with the one or more supplemental vacuum panels mentioned above for jar 100, the one or more supplemental vacuum panels may take up a portion of in induced vacuum caused by cooling a filled and sealed jar 200, and an inner wall may flex or move to take up or remove a second portion of the induced vacuum.

Figure 3A:
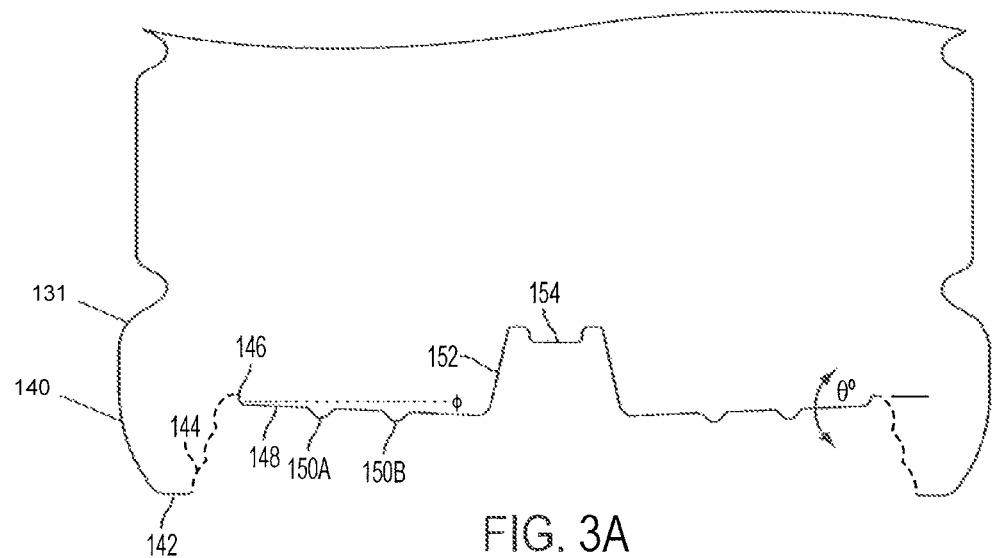
FIG. 3A is a cross section view of a base portion of a plastic container according to embodiments of the disclosed subject matter.
Figure 3B:
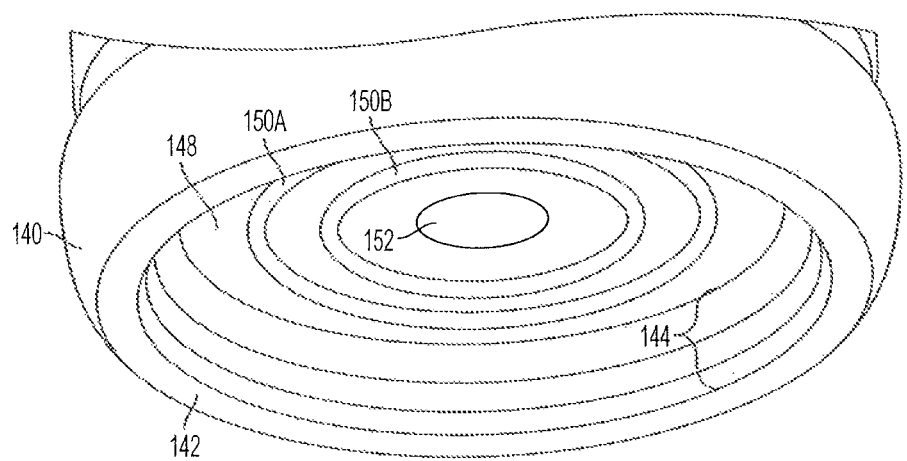
FIG. 3B is a bottom perspective view of the base portion of FIG. 3A.
Figure 3C:
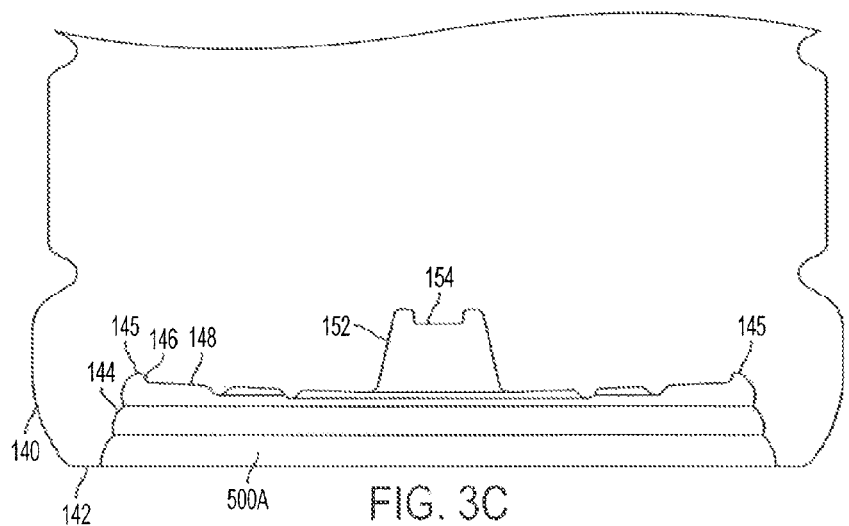
FIG. 3C is a cross section view of the base portion of the container of FIG. 3A and a portion of a corresponding base mold according to embodiments of the disclosed subject matter.
Figure 3D:
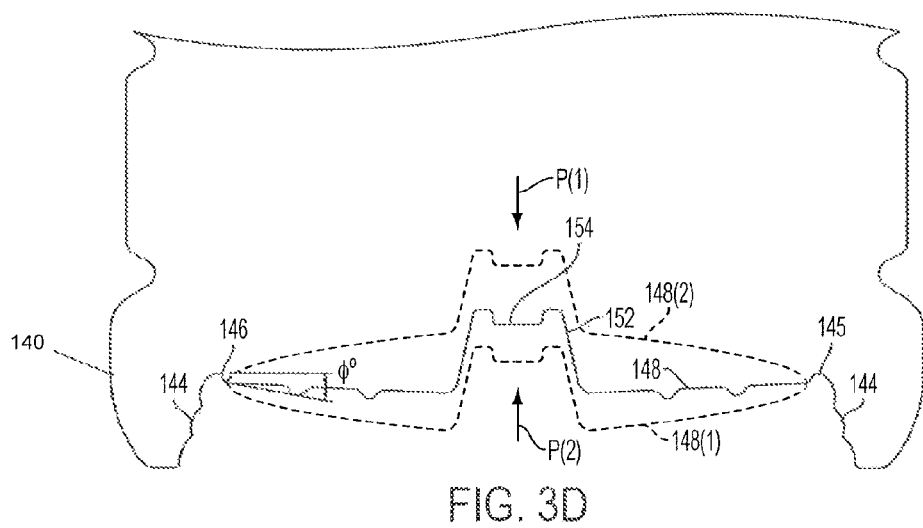
FIG. 3D is an operational illustration of the base portion of FIG. 3A according to embodiments of the disclosed subject matter.

FIGS. 3A-3D show views of base 140, and, in particular, a bottom end thereof, with FIG. 3A being a cross section view of base 140, FIG. 3B being a bottom perspective view of base 140, FIG. 3C being a cross section view of base 140 with a base mold portion 500A, and FIG. 3D being a basic operational illustration of a manner in which the base can be constructed to operate.

Generally speaking, the bottom end of the base 140 is constructed and operative to be responsive to elevated temperature processing, such as during and after hot-filling and sealing and optionally during pasteurization and/or retort processing. The bottom end may also be subjected to forces caused by post hot-fill and cooling operations, such as temperature-induced forces from varying temperatures in transit to or in storage at a distributor (e.g., wholesale or retail vendor), prolonged effects of the weight of the product stored therein over time, etc., and can accommodate such forces, such as by preventing a portion of the bottom end from setting and/or moving to a non-recoverable position.

The bottom end of base 140 includes a bearing portion 142, for example, a standing ring, which can define a bearing or standing surface of the jar. Optionally, the base 140 can be smooth and without surface features from bearing portion 142 to lower label bumper or stop 131.

The bottom end also can include an up-stand wall 144 and an inner wall 148. Up-stand wall 144 can extend upward from bearing portion 142. In the embodiment shown in FIGS. 3A through 3D, up-stand wall 144 extends from bearing portion 142 axially upward and radially inward. However, optionally, up-stand wall 144 may extend only axially upward without extending radially inward. As yet another option, up-stand wall 144 may extend axially upward and slightly radially outward.

The "dashed" line in FIG. 3A indicates that up-stand wall 144 can be of any suitable configuration. For example, in various embodiments, up-stand wall 144 can have a geometry in the form of a stacked ring or rib configuration, for instance, where any suitable number of rings or ribs can be stacked, such as two, three, four, or five. The rings can be stacked directly vertically on top of one another, or may taper radially inward with each successive ring. Alternatively, only one ring may be implemented. Such use of up-stand geometry, and in particular, stacked ring configurations may provide the ability to use relatively less material to form a jar, while providing desired jar characteristics, such as the jar's ability to compensate for internal pressure variations due to elevated temperature and/or cooling processing. In various embodiments, up-stand wall 144 can be as described in U.S. application Ser. No. 13/210,350 filed on Aug. 15, 2011, the entire content of which is hereby incorporated by reference into the present application. In another embodiment, up-stand wall 144 can include a plurality of ribs or braces extending partially or fully along the length of the up-stand wall or around its circumference.

Inner wall 148 can be circumscribed by the up-stand wall 144 in end view of the container, and the inner wall 148 and up-stand wall 144 can be cooperatively operative so as to accommodate or be responsive to pressure variation within the jar after the jar has been hot-filled with a product at a filling temperature as described herein and sealed with an enclosure (e.g., a threaded lid). Inner wall 148 also can accommodate or be responsive to pressure variation within the jar in response to cooling of the jar. Further, inner wall 148 can accommodate or be responsive to pressure variation within the jar in response to pasteurization and/or retort processing.

In various embodiments, inner wall 148 may be characterized as a diaphragm that can move or flex upward and downward in response to pressure variations within the jar. For example, inner wall 148 may move downward due to headspace pressure caused by hot-filling and sealing the jar. Movement upward may be due to an induced vacuum within the jar as the hot-filled and sealed jar and its contents cool.

As indicated in FIG. 3A and shown by the dashed lines in FIG. 3D, inner wall 148 can move upward and downward by an angle θ in response to pressure variations within the jar. The angle θ is merely diagrammatic and can represent any suitable angle, entirely above an initial, blow molded position of the inner wall 148, entirely below an initial blow molded position of the inner wall 148, or both above and below an initial blow molded position of the inner wall 148. In various embodiments, inner wall 148 is at or above the bearing surface at all times during its movement (e.g., downward movement).

Figure 4:
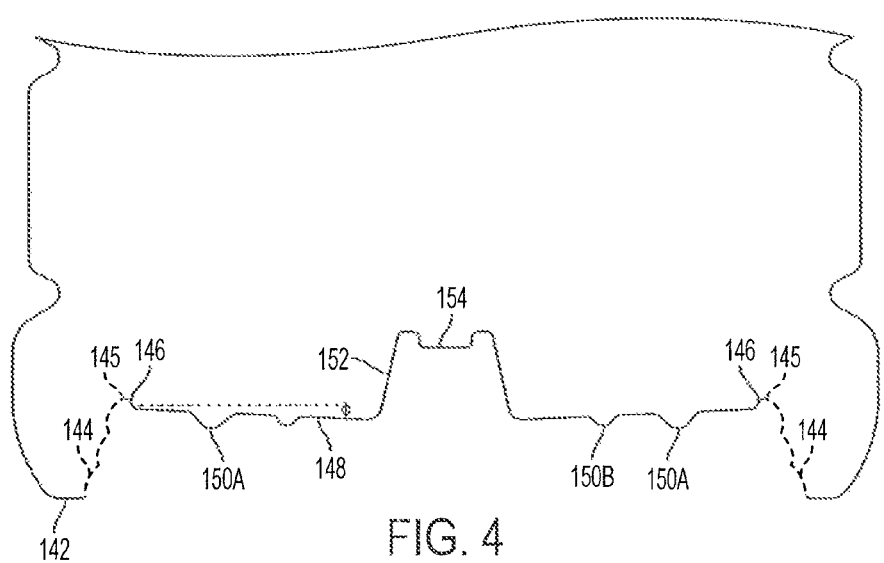
FIG. 4 is a cross section view of another embodiment of a base portion according to embodiments of the disclosed subject matter.

Inner wall 148 can include a plurality of concentric rings 150A, 150B. In various embodiments, rings 150A, 150B can be in spaced-apart relationship with one another. Further, though FIGS. 3A-3D show two rings, any suitable number may be implemented, including one, three, or four, for instance. Further, rings 150A, 150B can be of any suitable configuration, for example, having an outer surface and/or an inner surface that is convex. Incidentally, FIGS. 3A through 4 show the outer surface of the rings 150A, 1503 being convex. Optionally or alternatively, in various embodiments, an interior and/or an exterior surface of one or more of the rings may be concave. Rings 150A 1501 also may be irregular or non-uniform (e.g., thicker, thinner, or discontinuous at certain portions). In another embodiment, concentric rings may be replaced by radially outward extending ribs or braces that can extend fully or partially from the center of the jar to the up-stand wall 144 or to the bearing portion 142. Additionally, some or all of the rings may be of similar configuration or differing configurations.

Rings 150A, 150B can be operative to control the extent to which the inner wall 148 may flex downward. Rings 150A, 150B can be constructed and operative to prevent inner wall 148 from moving downward past a predetermined downward limit, for example, beyond a point of recovery. Optionally, rings 150A, 150B may assist inner wall 148 move back upward, for example to the initial blow molded position of the inner wall 148 or, for example, above the initial blow molded position. Such movement above the initial blow molded position may relieve some or all of an induced vacuum and even create a positive pressure within the jar. In the case where not all of the vacuum is relieved, the jar may have one or more supplemental vacuum panels arranged somewhere other than the bottom end portion of the jar to reduce the remainder of the vacuum. In various embodiments, movement upward of inner wall 148 can occur without the aide of anything other than the configuration and design of the jar itself, particularly the bottom end portion, and an induced vacuum in the filled and sealed jar. Optionally, a mechanical force, such as a rod and actuator, may be used to move upward the inner wall 148.

Figure 7A:
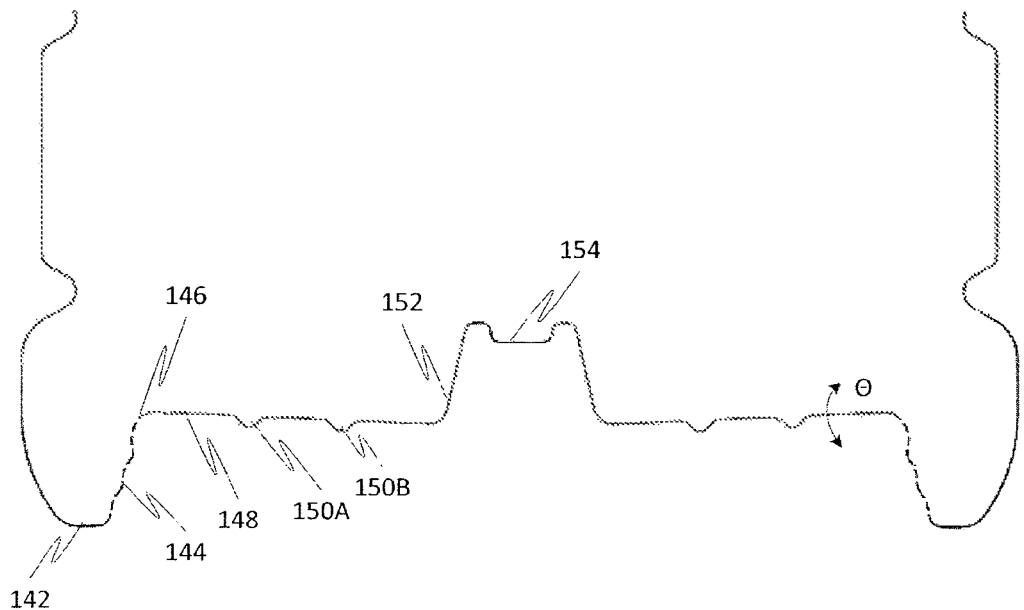
FIG. 7A is a cross section view of a base portion of a plastic container according to embodiments of the disclosed subject matter, similar to the base portion shown in FIG. 3A but without a ridge portion.

In various embodiments, up-stand wall 144 can extend from bearing portion 142 axially upward to an apex thereof. As shown in FIG. 3A, the apex of up-stand wall 144 can be a ridge or rim 146 that is circular in end view of the jar. From the top of ridge 146, there may be a relatively sharp drop off to an inner wall 148. From the bottom of the drop off, the inner wall 148 may extend horizontally, downward (e.g., by an angle φ) or at a subtle radius downward or upward. Optionally, there may be no ridge and the top of the up-stand wall 144, and the up-stand wall can transition gradually or sharply horizontally, tangentially, downward, or at a subtle radius downward or upward to inner wall 148. FIG. 7A shows, is a cross section, another example of a base portion according to embodiments of the disclosed subject matter without a ridge, with item 146 now representing a horizontal transition from up-stand wall 144 to inner wail 148. Of course, in embodiments, the inner wall 148 may extend downward by an angle φ.

Thus, inner wall 148 can be formed at a decline (ridge 146 or no ridge) with respect to horizontal, represented by angle φ. Angle φ can be any suitable angle. In various embodiments, angle φ can be 3,° 8°, 10° any angle from 3° to 12°, from 3° to 14°, from 8° to 12°, or from 8° to 14°. Alternatively, as indicated above, inner wall 148 may not be at an angle, and may horizontally extend, or, inner wall 148 may be at an incline with respect to horizontal in its as-formed state.

FIG. 4 shows an alternative embodiment, whereby ring 150A is larger than ring 150B. For example, ring 150A can project downward and outward more than does ring 150B. The alternative may also be true—i.e., in alternative embodiments, ring 150B may be larger than ring 150A. Rings 150A, 150B, optionally or alternatively, may be constructed and operative to facilitate movement back up of inner wall 148.

Optionally, inner wall 148 also can have a nose cone 152 with a gate 154, which may be used for injection of plastic when blow molding the jar. In various embodiments, nose cone 152 may serve as an anti-inverting portion that is constructed and operative to move downward in response to the increased pressure and/or upward in response to the decreased pressure without deforming or without substantially deforming as it moves upward and/or downward with the inner wall 148.

Thus, as indicated above, the inner wall 148 may move downward from its as-formed position and then upward. In various embodiments, the inner wall 148 may move back up to its initial position. Optionally, inner wall 148 may move back up to a position above its initial position, for example, to a position above horizontal or a position above horizontal.

In various embodiments, the inner wall 148 can flex in response to the pressure variation with the jar after the jar has been hot-filled with a product at a filling temperature as described herein and sealed with an enclosure. For instance, referring again to FIG. 3D, inner wall 148 may flex downward as shown by dashed line 148(1) in response to an internal pressure P(1). Internal pressure P(1) may be caused by elevated temperature of a hot product being filled into the jar and then the jar being sealed, for example (i.e., headspace pressure). Internal pressure P(1) also may be caused by elevated temperature of a product upon pasteurization or retort processing of the filled and sealed container at an elevated temperature. Optionally, inner wall 148 can be constructed so that it is at or above a horizontal plane running through the bearing surface at all times during the downward flexing of the inner wall 148.

Optionally or alternatively, inner wall 148 may flex upward as shown by dashed line 148(2) in response to an internal pressure P(2) (which is shown outside the jar in FIG. 3D but can be representative of a force caused by an internal vacuum created by cooling a hot-filled product). In various embodiments, up-stand wall 144 may be configured and operative to withstand movement as the inner wall 148 flexes in response to the pressures within the jar after the jar has been filled and sealed with a closure.

Figure 5A:
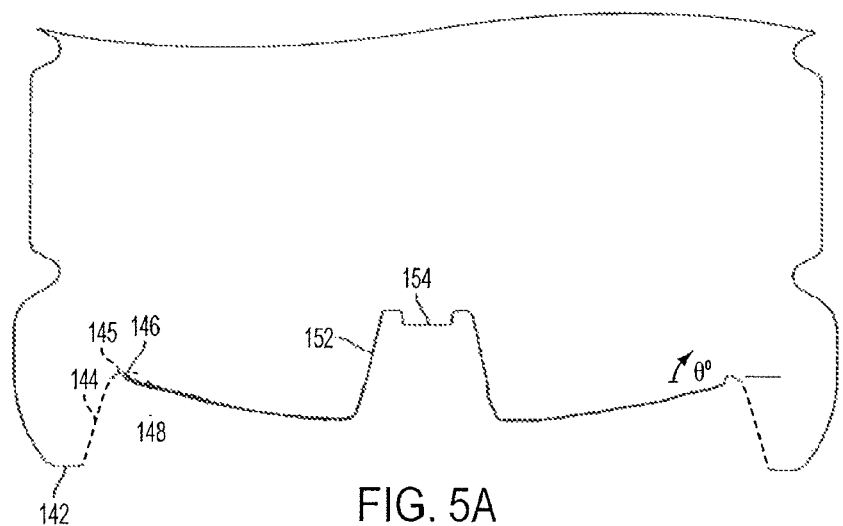
FIG. 5A is a cross section view of another embodiment of a base portion of a plastic container according to embodiments of the disclosed subject matter.
Figure 5B:
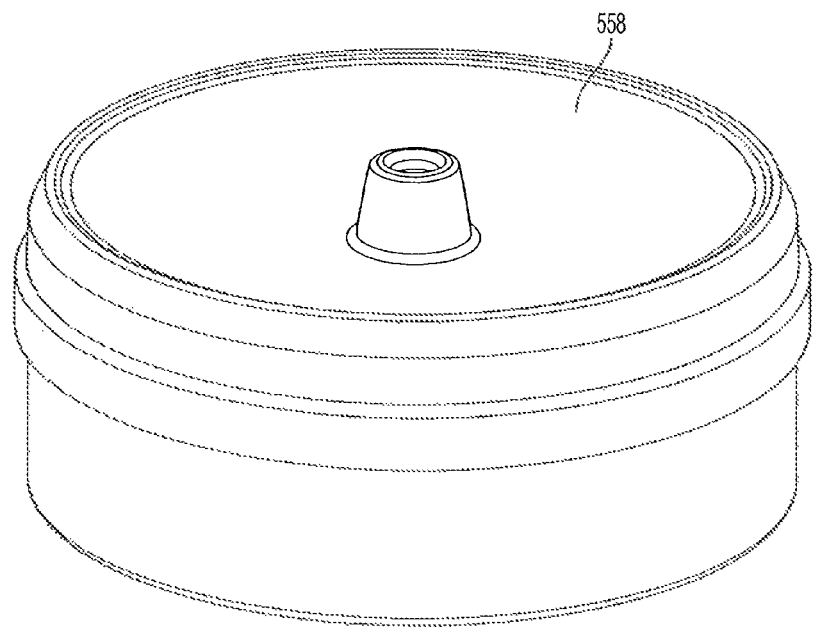
FIG. 5B is a base mold according to embodiments of the disclosed subject matter.

FIG. 5A is a cross section view of another embodiment of a base portion of a plastic container according to the disclosed subject matter. FIG. 5B is a base mold according to embodiments of the disclosed subject matter that may be used to mold at least the inner wall 148 of the base of FIG. 5A or a variation thereof.

The base portion shown in FIG. 5A has an inner wall 148 that is differently configured and which operates differently from the inner wall shown in FIGS. 3A through 3D, 4, and 7A. Also note that in FIG. 5A, up-stand wall 144 is shown as being without rings. However, the dashed lines in FIG. 5A for up-stand wall 144 indicate that the up-stand wall 144 can be of any suitable configuration, such as described above for FIGS. 3A through 3D or as shown in FIG. 5A.

Figure 7B:
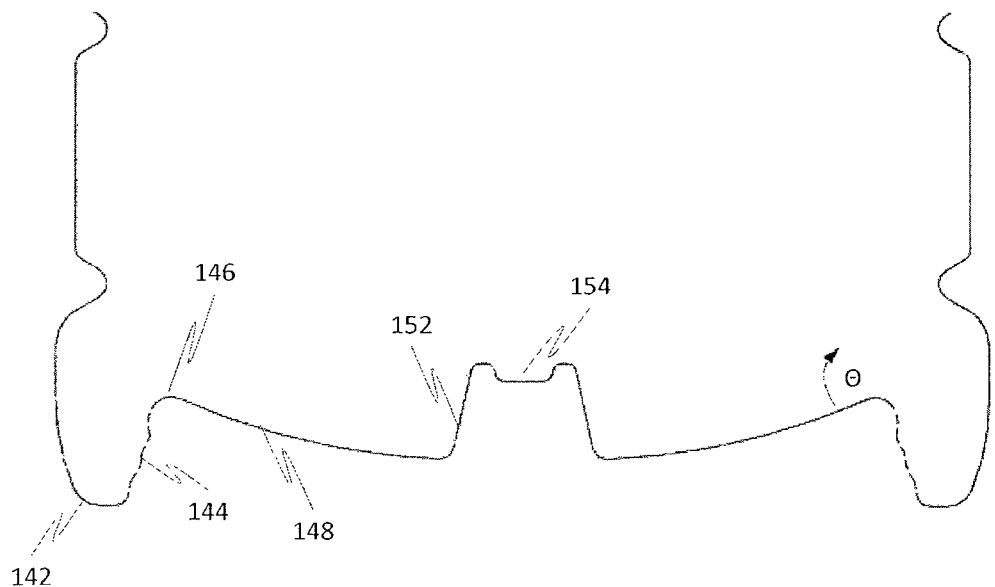
FIG. 7B is a cross section view of a base portion of a plastic container according to embodiments of the disclosed subject matter, similar to the base portion shown in FIG. 5A but without a ridge portion.

The base portion shown in FIG. 5A also includes another wall 146 which extends from an apex 145 of the up-stand wall 144 downward and radially inward to meet inner wall 148 to form a ridge or rim that is circular in end view of the jar. As shown in FIG. 5A, wall 146 forms a relatively sharp drop off from apex 145 to inner wall 148. Optionally, there may be no ridge and the top of the up-stand wall 144, and the up-stand wall 144 can transition gradually horizontally, tangentially, or at a subtle radius downward or upward to inner wall 148. FIG. 7B shows, is a cross section, another example of a base portion according to embodiments of the disclosed subject matter without a ridge, with item 146 now representing a horizontal or subtle radius downward transition from up-stand wall 144 to inner wall 148. Optionally, inner wall 148 can be curved axially outward along a single major radius or parabolic.

A gate riser (i.e., nose cone 152 with a gate 154) may be located at a central longitudinal axis of the jar. The gate riser can be a relatively rigid portion that is constructed and operative to move upward in response to the decreased pressure without deforming. The inner wall 148 can have a smooth portion without any surface features circumscribing the gate riser, and the smooth portion can extend from the gate riser to the wall 146 or up-stand wall 144 (in the case of an embodiment with no ridge or apex 145). Optionally or alternatively, a slight step or transition portion may be implemented in the inner wall 148. In various embodiments, the smooth portion of the inner wall 148 can have a substantially uniform thickness and may be without any heavy spots.

Inner wall 148 can accommodate pressure variation within the jar after the jar has been hot-filled with the product at the temperature from 185° F. to 205° F., for instance, and sealed with a closure. The pressure variation can include increased pressure and decreased pressure, separately. For instance, increased pressure can include headspace pressure associated with the hot-filling with the product at the temperature from 185° F. to 205° F. and sealing the jar, internal pressure associated with pasteurization, or internal pressure associated with retort processing. Decreased pressure can include an internal vacuum associated with cooling of the filled and sealed jar.

Inner wall 148 can resist movement downward in response to the increased pressure. Further, the configuration of the end of the base portion, and, in particular, the inner wall 148 is such that the bottom end of the base portion is prevented from taking set.

Additionally, inner wall 148 can move upward in response to the decrease in pressure (i.e., the vacuum), for example, by an angle theta θ.

Incidentally, the angle theta θ shown in FIGS. 5A and 7B may not be the same as the angle theta θ shown for FIG. 3A. Alternatively, the angles may be the same. In various embodiments, movement upward of the inner wall 148 can cause the inner wall 148 to invert. Upward movement of the inner wall 148 may reduce a portion of an induced internal vacuum. The portion of the vacuum can be the entire portion or less than the entire portion. Further, an overpressure in the jar may be created due to movement upward of the inner wall 148. In the case where not all of the vacuum is reduced, one or more supplemental vacuum panels arranged somewhere other than the bottom end portion of the jar may be used to reduce the remainder of the vacuum. Optionally, a mechanical apparatus, such as a rod end movable via an actuator, can be used to move the inner wall 148 upward or assist with movement of the inner wall 148 upward. In various embodiments, inner wall 148 may move upward an amount based on the pull of the vacuum, and a mechanical apparatus may be used to push up the inner wall 148.

FIG. 5B is a base mold to form a bottom end portion of a base of a plastic container according to embodiments of the disclosed subject matter. The base mold shown in FIG. 5B can include a body portion, a bearing surface forming portion to form a portion of the bottom bearing surface, an up-stand wall forming portion, and an inner wall forming portion 558. In various embodiments, the base mold shown in FIG. 5B can be used to form the base portions shown in FIG. 5A, FIG. 7B, or a variation thereof, wherein one variation thereof can include an up-stand wall 144 having a slight break or transition at a point along its length whereby it transitions from one angle upward (and possibly radially inward) to another angle upward and radially inward.

Figure 6A:
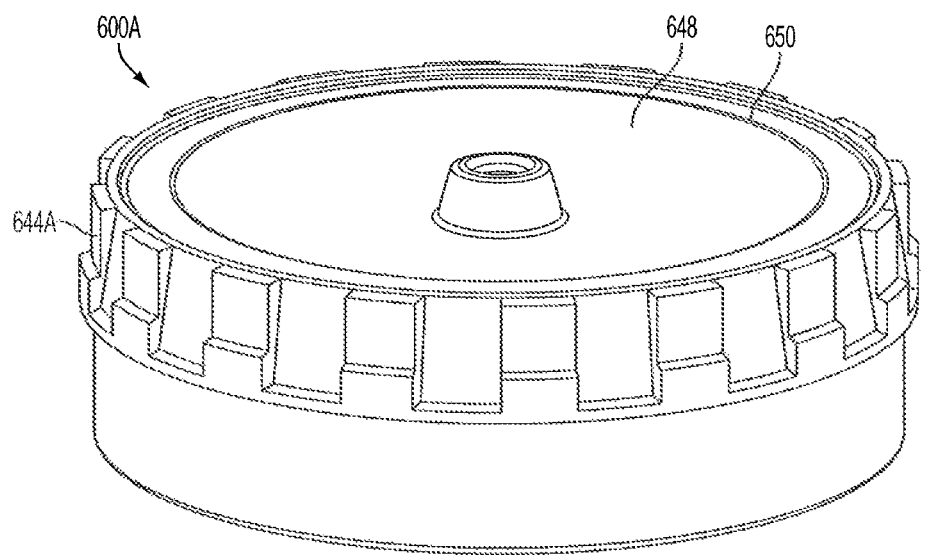
FIGS. 6A-6C illustrate alternative base mold embodiments according to the disclosed subject matter.
Figure 6B:
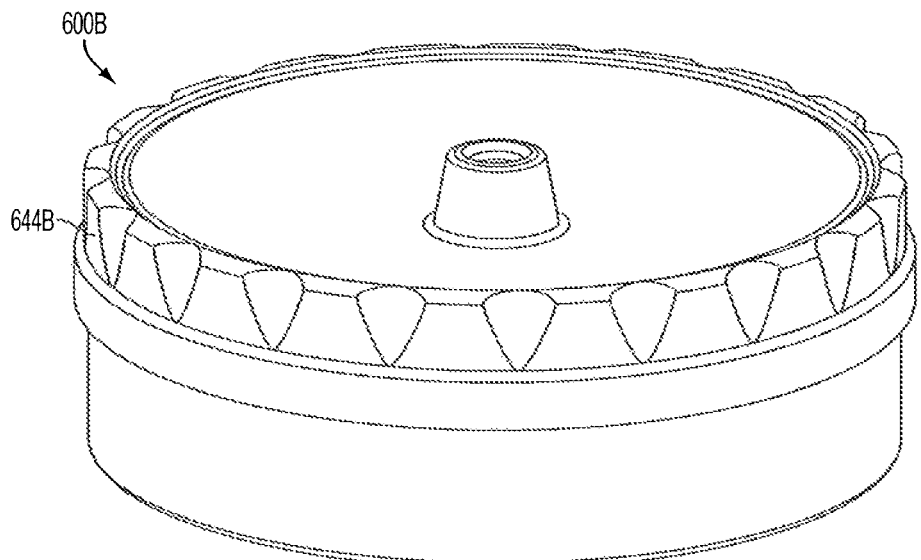
Figure 6C:
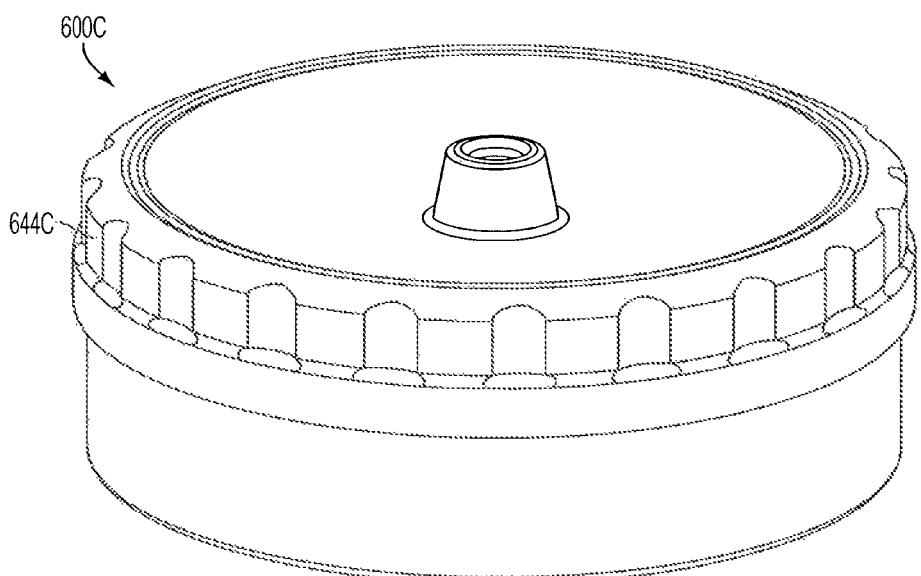

FIGS. 6A-6C show alternative base mold embodiments 600A-600C and respective up-stand wall geometries 644A-644C according to the disclosed subject matter for forming base portions similar in operation to those shown in FIGS. 5A and 7B. FIGS. 6A-6C illustrate inner wall forming portions of the molds 600B and 600C that smooth faces to form respective inner walls that are smooth and without any transitions in their body. The base mold 600A on the other hand has an inner wall forming portion that has two distinct portions 648, 650 and a slight transition or step down from portion 650 radially inward to portion 648 to form a corresponding inner wall.

Figure 8:
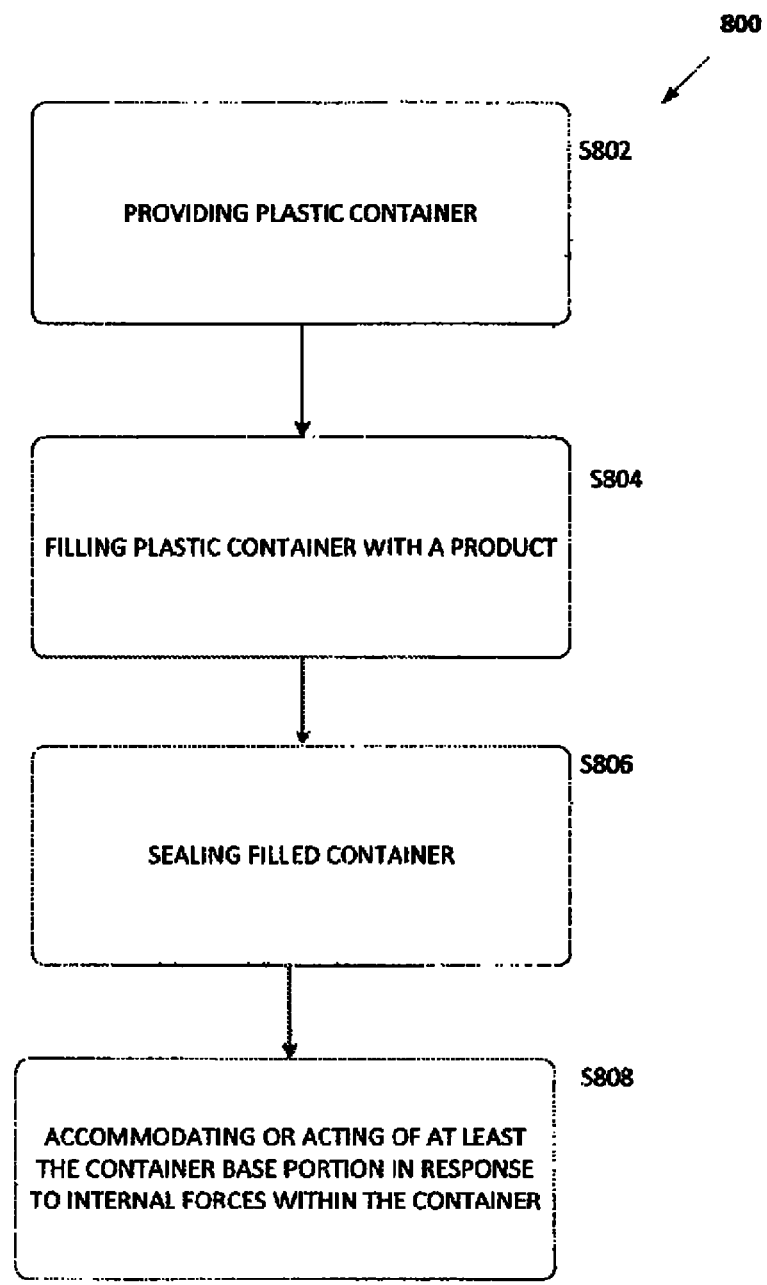
FIG. 8 is a flow chart for a method according to embodiments of the disclosed subject matter.

FIG. 8 is a flow chart for a method 800 according to embodiments of the disclosed subject matter.

Methods according to embodiments of the disclosed subject matter can include providing a plastic container as set forth herein (S802). Providing a plastic container can include blow molding or otherwise forming the container. Providing a plastic container also can include packaging, shipping, and/or delivery of a container. Methods can also include filling, for example, hot-filling the container with a product such as described herein, at a temperature as described herein (S804). After filling, the container can be sealed with a closure such as described herein (S806). After sealing filling and sealing the container, a base portion of the container can accommodate or act in response to an internal pressure or force in the filled and sealed container such as described herein (S808). As indicated above, internal pressure within the sealed and filled container can be caused by hot-filling the container, pasteurization processing to the container, retort processing to the container, or cooling processing to the container. The container base portion can accommodate or act responsively as set forth herein based on the internal pressure or force and the particular configuration and construction of the base portion as set forth herein.

Though containers in the form of wide-mouth jars have been particularly discussed above and shown in various figures, embodiments of the disclosed subject matter are not limited to wide-mouth jars and can include plastic containers of any suitable shape or configuration and for any suitable use, including bottles, jugs, asymmetrical containers, single-serve containers or the like. Also, embodiments of the disclosed subject matter shown in the drawings have circular cross-sectional shapes with reference to a central longitudinal axis. However, embodiments of the disclosed subject matter are not limited to containers having circular cross sections and thus container cross sections can be square, rectangular, oval, or asymmetrical.

Further, as indicated above, hot-filling below 185° F. (e.g., 180° F.) or above 205° F. is also embodied in aspects of the disclosed subject matter. Pasteurizing and/or retort temperatures above 185°, above 200° F., or above 205° F. (e.g., 215° F.) are also embodied in aspects of the disclosed subject matter.

Containers, as set forth according to embodiments of the disclosed subject matter, can be mode of a thermoplastic made in any suitable way, for example, blow molded (including injection) PET, PEN, or blends thereof. Optionally, containers according to embodiments of the disclosed subject matter can be multilayered, including a layer of gas barrier material, a layer of scrap material, and/or a polyester resin modified for ultra-violet ("UV") light protection or resistance.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

The invention claimed is:

1. A hot-fillable, blow-molded plastic wide-mouth jar configured to be filled with a viscous food product at a temperature from 185° F. to 205° F., the jar comprising:
    a cylindrical sidewall, said sidewall being configured to support a wrap-around label;
    a wide-mouth finish projecting from an upper end of said sidewall via a shoulder, said finish being operative to receive a closure, and said shoulder defining an upper label stop above said sidewall; and
    a base defining a lower label stop below said sidewall, wherein said base has a bottom end that includes:
        a bearing portion defining a standing surface for the jar, the base being smooth and without surface features from said bearing portion to said lower label stop;
        an up-stand wall which extends upward and radially inward from said bearing portion; and
        a diaphragm circumscribed by said up-stand wall in end view of the jar, said diaphragm having an inner wall and a substantially centrally located nose cone, said nose cone having a smooth frustum-shaped sidewall extending into an interior of the jar, in an as-formed, blow molded condition, said inner wall in cross-sectional side view is substantially planar and extends at an angle in a range of three to fourteen degrees downward from horizontal toward the nose cone, said diaphragm being configured to move downward in response to increased pressure within the container and upward in response to a vacuum within the container after the container is hot-filled and sealed;
    wherein said diaphragm in end view has a plurality of concentric rings in spaced-apart relation with one another, and in the as-formed, blow molded condition, said plurality of concentric rings includes an inner concentric ring and an outer concentric ring, said inner concentric ring having a smaller diameter than said outer concentric ring, and said inner concentric ring extending from said inner wall at an inner portion of said inner wall that is lower in cross-sectional view than an outer portion of said inner wall where said outer concentric ring extends from said inner wall, and
    wherein each said concentric ring has an inner surface that is concave, with inner being defined relative the interior of the jar.

2. The jar according to claim 1, wherein increased pressure is associated with one or more of pasteurization processing and retort processing of the jar when filled and sealed with the closure.

3. The jar according to claim 1, wherein said diaphragm is constructed so as to be at or above the bearing surface at all times during the downward movement thereof.

4. The jar according to claim 1, wherein the upward movement of said diaphragm reduces a portion of the vacuum less than the entire amount of the vacuum.

5. The jar according to claim 4, wherein the jar further comprises a supplemental vacuum panel arranged somewhere other than the bottom end portion of the jar, and the supplemental vacuum panel reduces another portion of the vacuum.

6. The jar according to claim 1, wherein the upward movement of said diaphragm reduces the entire portion of the vacuum.

7. The jar according to claim 6, wherein the upward movement of said diaphragm creates a positive pressure within the jar.

8. The jar according to claim 1, wherein said nose cone defines an anti-inverting portion at a central longitudinal axis of the jar, said anti-inverting portion being constructed and operative to move downward in response to the increased pressure and upward in response to the decreased pressure without deforming.

9. The jar according to claim 1, wherein the hot-fill temperature is from 200° F. to 205° F.

10. The jar according to claim 1, wherein said diaphragm and said up-stand wall are constructed to be cooperatively operative so as to prevent said diaphragm from moving downward beyond a predetermined point of recovery for said diaphragm.

11. The jar according to claim 1, wherein said diaphragm and said up-stand wall are constructed to be cooperatively operative such that the diaphragm moves upwardly after downward movement thereof to a position at or above its initial, as-formed position.

12. The jar according to claim 11, wherein the position above its initial position is a position upward from horizontal.

13. The jar according to claim 1, wherein each said concentric ring has one or more of an outer surface that is convex as defined relative the exterior of the jar.

14. The jar according to claim 1, wherein said up-stand wall is constructed and operative to remain substantially stationary during one or more of upward movement and downward movement of said diaphragm.

15. The jar according to claim 1, wherein a first concentric ring of said plurality of concentric rings projects downward and outward more than does a second concentric ring of said plurality of concentric rings.

16. The jar according to claim 1, wherein said plurality of concentric rings are constructed and operative to prevent said diaphragm from moving downward beyond a predetermined point of recovery for said diaphragm and to facilitate movement back up of said diaphragm.

* * * * *